United States Patent [19]

Barrera

[11] Patent Number: 4,631,814
[45] Date of Patent: Dec. 30, 1986

[54] DEVICE FOR INSERTING PRE-WOUND COILS IN THE SLOTS OF STATORS OF DYNAMO-ELECTRIC MACHINES

[75] Inventor: Giorgio Barrera, Turin, Italy

[73] Assignee: Officine Meccaniche Pavesi & C.S.p.A., Turin, Italy

[21] Appl. No.: 688,155

[22] Filed: Dec. 31, 1984

[30] Foreign Application Priority Data

Mar. 13, 1984 [IT] Italy ................ 67235 A/84

[51] Int. Cl.$^4$ ............................................. H02K 15/10
[52] U.S. Cl. ..................................... 29/736; 29/596
[58] Field of Search ............... 29/734, 736, 732, 596, 29/606

[56] References Cited

U.S. PATENT DOCUMENTS

| | | | |
|---|---|---|---|
| 3,559,268 | 2/1971 | Droll | 29/732 |
| 3,698,063 | 10/1972 | Smith | 29/732 |
| 3,815,206 | 6/1974 | Smith | 29/736 X |
| 4,476,625 | 10/1984 | Bricker et al. | 29/734 |
| 4,480,379 | 11/1984 | Witwer | 29/736 X |

Primary Examiner—Carl E. Hall
Attorney, Agent, or Firm—Cushman, Darby & Cushman

[57] ABSTRACT

A device for inserting pre-wound coils into electric motors, the device having an annular series of coil-guide bars for receiving pre-wound coils for insertion into the slots of the stator, an annular series of key-guide bars surrounding the coil-guide bars and terminating a short distance beyond the free ends of the coil-guide bars, so as to permit the stator to bear on the free ends of the key-guide bars and surround the coil-guide bars with the pole faces of the stator in engagement with the external faces of the coil-guide bars. The device also has a pusher member slidable through the series of coil-guide bars to insert the coils in the stator slots. Each coil-guide bar engages the stator only in correspondence with the respective pole face and correct angular positioning of the stator with respect to the two series of bars is effected by orienting means, such as terminal projections on the key-guide bars, engageable with the sides of the stator slots.

1 Claim, 6 Drawing Figures

DEVICE FOR INSERTING PRE-WOUND COILS IN THE SLOTS OF STATORS OF DYNAMO-ELECTRIC MACHINES

The present invention relates to devices for inserting pre-wound coils in the slots of stators of dynamoelectric machines, of the type comprising:

a series of coil-guide bars for receiving the pre-wound coils to be inserted in the stator slots:

a series of key-guide bars surrounding the series of coil-guide bars and terminating a short distance beyond the free ends of the coil-guide bars, so as to permit the stator to bear on the free ends of the key-guide bars in such a way as to surround the coil-guide bars with the pole faces of the stator in engagement with the external faces of the coil-guide bars, and a pusher member slidable through the series of coil-guide bars to insert the coils in the stator slots.

A device of the type specified above is described and illustrated, for example, in U.S. Pat. No. 3,324,536. The term "keys", which appears in the present description and in the subsequent claims, is used by persons skilled in the art to indicate the inserts, usually U-shaped and made from insulating material, with which the stator slots are closed so as to protect the pre-wound coils inserted therein.

According to the prior art, each coil-guide bar has a pair of longitudinal lips along the sides of its external face. When the stator is positioned around the series of coil-guide bars, the external face of each of these bars is engaged with a respective pole face of the stator, while the two lips are engaged with the two contiguous sides of the two stator slots adjacent this pole face. Firstly, the lips serve as orienting means for effecting the correct angular positioning of the stator in relation to the series of coil-guide bars. Secondly, the lips should serve to protect the wire constituting the coils during insertion in the stator slots, so as to prevent it from being damaged by the corners of the pole faces of the stator.

The presence of the lips does, however, involve the disadvantage of significantly limiting the width of the mouth of the stator slots, which hinders the insertion of coils made from wires of relatively large diameter, as required in the case of alternators for motor vehicles. It is then necessary to have recourse to special measures such as providing the slots with wider mouths, to the detriment of the efficiency of the alternator, and/or to replace the large-diameter wire with two or more wires of a corresponding section in parallel, with a higher product cost and difficulties of winding.

The object of the present invention is to avoid the disadvantages mentioned above.

With a view to achieving this object, the invention provides a device of the type specified at the start of the present description, characterised in that each coil-guide bar engages the stator only in correspondence with the respective pole face, and in that the device includes orienting means for effecting the correct angular positioning of the stator, which do not form part of the coil-guide bars.

Research and experiments conducted by the Applicants have shown that the lips of the prior art, provided along the sides of the external face of each coil-guide bar, are not essential for protecting the wire of the coils during insertion in the slots, particularly in the case of stators for alternators provided with an insulating covering, for example of epoxy resin. On the other hand, according to the invention, orienting means for effecting the correct angular positioning of the stator are provided, which do not form a part of the coil-guide bars and may be constituted, for example, by terminal projections on the key-guide bars, engageable with the sides of the stator slots.

The coil-guide bars of the device according to the invention therefore lack the aforesaid lips, and this permits the elimination of the aforementioned disadvantage arising from the restriction in the space available for the insertion of the coils in the stator slots.

At the same time, the elimination of the lips permits the manufacture of the coil-guide bars to be rendered much simpler and more economical. It is also possible to make these bars from plastics material or composite material (based, for example, on carbon fibres or glass fibres) as well as steel, with further increases in simplification and economy of manufacture. In fact, the coil-guide bars of the prior art, provided with the orienting lips, cannot be made from plastics material because of the high risk of breakage to which these lips are prone when metal is not used.

Although, as mentioned above, the present invention offers particular advantages when the stator has an insulating covering of epoxy resin, experiments conducted by the Applicants have shown that the device can also function perfectly, preventing damage to the wire of the coils during insertion, when each stator slot is insulated in the traditional manner, by means of a paper insulating element.

Further characteristics and advantages of the present invention will become apparent from the description which follows with reference to the appended drawings, provided purely by way of a non-limiting example, in which.

Figure 1:
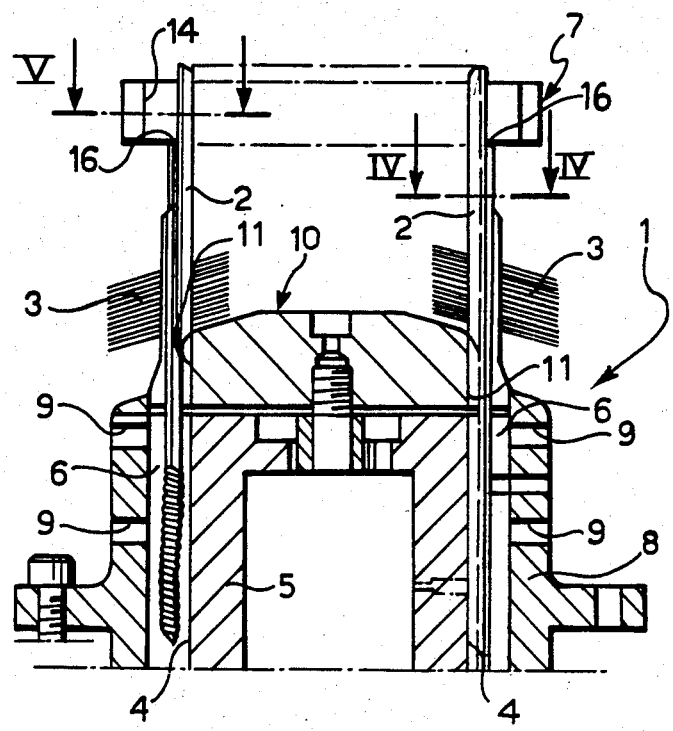
FIG. 1 is a schematic elevational view of a device according to the invention.

With reference to FIG. 1, a device for inserting pre-wound coils in the slots of stators of dynamoelectric machines is generally indicated 1.

The device 1 includes an annular series of coil-guide bars 2 on which the pre-wound coils 3 to be inserted in the stator slots are positioned. The coil-guide bars 2 are partially housed within corresponding longitudinal grooves 4 formed in the external surface of a cylindrical body 5. Around the series of coil-guide bars 2 is arranged a series of key-guide bars 6 which terminate a short distance beyond the free ends of the coil-guide bars 2 so as to permit a stator 7 to bear on the free ends of the key-guide bars 6 and surround the coil-guide bars 2. The bars 6 are surrounded by a bush 8 provided with threaded holes 9 for the engagement of screws for pressing the bars 6 against the bars 2, and the latter against the inner surfaces of the respective grooves 4 in the cylindrical body 5, so as to lock the two series of bars in position. A pusher member, indicated 10, is mounted so as to be slidable through the series of coil-guide bars 2. The member 10 is provided on its periphery with a series of longitudinal grooves 11 in which the coil-guide bars 2 are slidably engaged.

A device having the structure described above is illustrated in U.S. Pat. No. 3,324,536.

With reference to this prior art solution (see also FIGS. 2 and 3), when the stator 7 is positioned around the ends of the coil-guide bars 2, the external face 12 of each of these bars is engaged with a respective pole face 13 of the stator, between two adjacent slots 14. According to the prior art, each bar 2 is also provided with two longitudinal orienting lips 15 along the sides of the external face 13, which engage the two contiguous sides of the two slots 14 adjacent each pole face 13.

These lips 15 serve as orienting means for effecting the angular positioning of the stator 7 correctly around the coil-guide bars 2. At the same time, as clearly shown in FIG. 2, the lips of the prior art device also serve for the mutual guiding of the bars 2 and the bars 6.

In the device according to the prior art, the pre-wound coils 3 are positioned around the coil-guide bars 2 and the stator 7 is then placed in the position illustrated in FIG. 1. The pusher member 10 is driven (by means not illustrated in FIG. 1) in such a way that it slides between the bars 2 in the direction of the stator 7. The movement of the pusher member 10 causes the coils 3 to slide along the coil-guide bars 2 until the coils are inserted in the slots 14 of the stator.

As already mentioned above, the presence of the orienting lips 15 (see FIG. 3) limits the width of the mouth of the stator slots 14, thus impeding the insertion of coils constituted by a wire of a relatively large diameter, as in the case of alternators for motor vehicles. In such cases, it has been necessary, until now, to provide slots with wider mouths, to the detriment of the efficiency of the alternator, or to replace the large-diameter wire by two or more wires of a corresponding section in parallel, with a consequent increase in the cost of the product and difficulties of winding.

Figure 2:
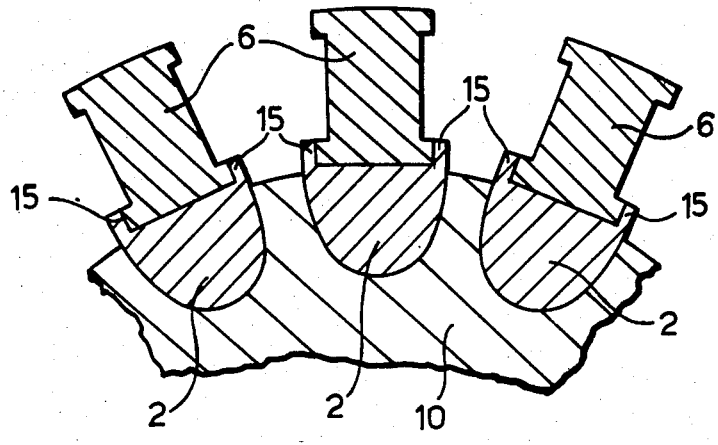
FIGS. 2 and 3 are sectional views of a device according to the prior art, taken along the lines IV—IV and V—V of FIG. 1.
Figure 3:
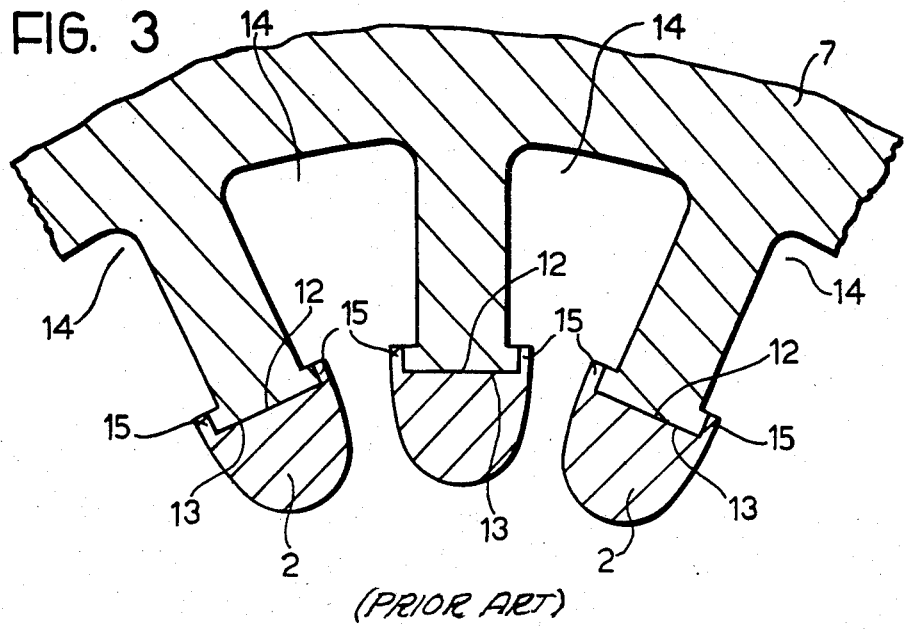
Figure 4:
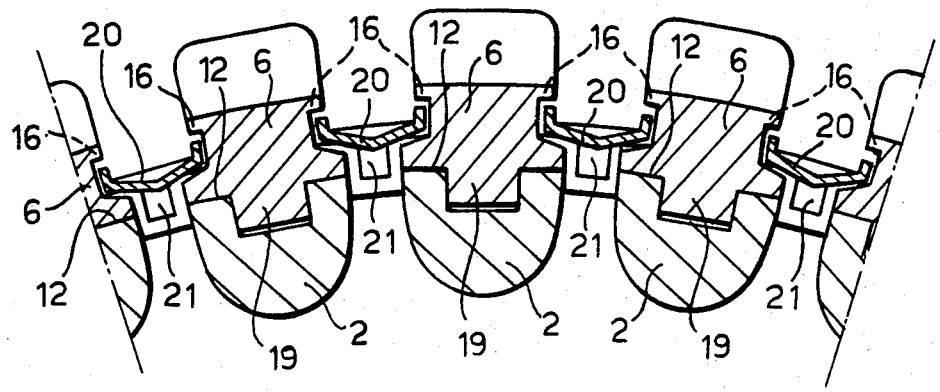
FIGS. 4 and 5 are sectional views taken along the lines IV—IV and V—V of FIG. 1, showing the device of the invention.
Figure 5:
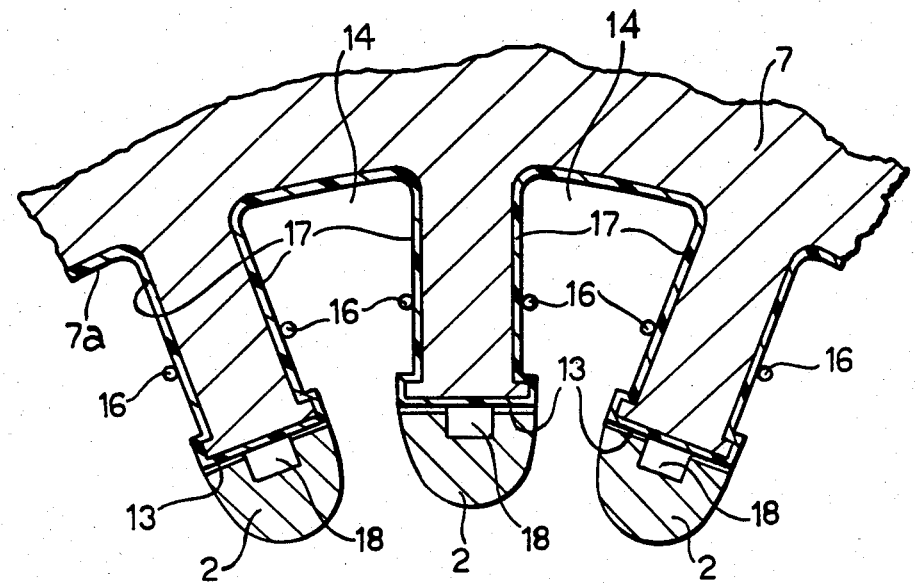

According to the invention (see particularly FIGS. 4 to 6), the orienting lips 15 are eliminated and the external face 12 of each coil-guide bar 2 engages only the respective pole face 13 of the stator (in FIGS. 4 and 5, the parts corresponding to those of FIGS. 2 and 3 are indicated by the same reference numerals). Each coil-guide bar 2 lacks parts capable of engaging the two sides of the two slots 14 adjacent the respective pole face 13.

In the device according to the invention, therefore, the correct angular positioning of the stator 7 in relation to the series of coil-guide bars 2 is achieved by orienting means which do not form a part of the coil-guide bars 2. For example, these orienting means may be constituted by a pair of short, cylindrical terminal projections 16 (see FIGS. 1, 5 and 6) which engage the sides 17 of the stator slots 14.

Figure 6:
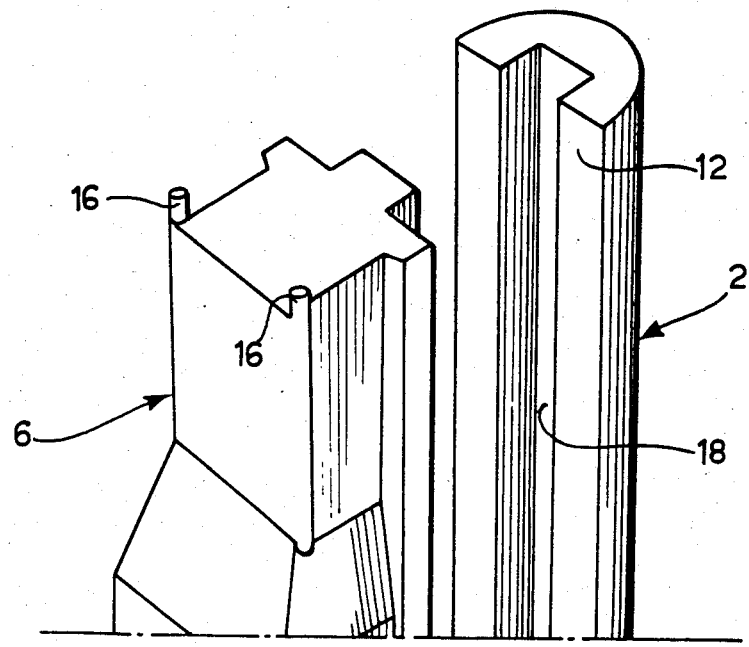
FIG. 6 is an exploded partial perspective view of a detail of the device of FIG. 1.

As illustrated in FIGS. 4 and 6, the adjacent faces of the bars 2 and 6 have complementary profiles for permitting a mutual guiding engagement between the bars. In particular, in the example illustrated, the external face 12 of each coil-guide bar 2 has a central longitudinal groove 18 in which a central longitudinal rib 19 on the respective key-guide bar 6 is engaged.

FIG. 4 also shows, by way of example, two keys 20 and, below them, the ends of the usual key-thrusting rods 21 for pushing the keys 20 towards the stator so as to move them into their position of closing the slots 14 after insertion of the coils.

As can be seen in FIG. 5, the present invention has been illustrated, by way of example, with reference to a stator 7 of the type provided with an insulating covering 7a of epoxy resin. The presence of the covering 7a avoids the risk of damage to the wire constituting the coils when the latter are inserted in the stator slots, notwithstanding the absence of the lips 15 illustrated in FIG. 3 with reference to the device according to the prior art. Research and experiments conducted by the Applicants, however, have also shown that, when the insulation of the stator slots is achieved in a conventional manner by means of paper insulating elements, the elimination of the lips 15 does not, in the majority of cases, involve damage to the wire constituting the coils when they are inserted in the stator slots.

Furthermore, the orienting lips are unnecessary in the device according to the invention, since the function of orienting the stator relative to the bars 2 and the function of mutual guiding of the bars 2 and the bars 6 are carried out by the projections 16 and the complementary parts 18, 19 of the bars, respectively.

Naturally, the orienting means for effecting the correct angular positioning of the stator could also be realised in a different manner from that illustrated in FIGS. 5 and 6, for example, by means of orienting members engageable with the external surface of the stator 7.

The elimination of the orienting lips from the coil-guide bars 2, on the one hand, allows the use of coils constituted by a wire of relatively large diameter and, on the other hand, makes the manufacture of these bars much simpler and more economical. In particular, it is possible to make these bars from plastics material or composite material (based, for example, on glass fibres and carbon fibres), with particular advantages from the aspect of simplicity of manufacture. In the case of the coil-guide bars of the prior art, however, the use of steel is essential since the orienting lips would otherwise be prone to fracture.

The functioning of the device according to the invention is entirely similar to that of devices according to the prior art, except for the different manner in which the stator 7 is oriented in the correct angular position when it is located around the coil-guide bars 2.

Naturally, whilst the principle of the invention remains the same, the details of construction and forms of embodiment may be varied widely with respect to what has been described and illustrated purely by way of example, without thereby departing from the scope of the present invention.

I claim:

1. A device for inserting pre-wound coils into stators having pole faces separated by slots, comprising:
    an annular series of coil-guide bars for receiving the pre-wound coils to be inserted in the stator slots, said bars having free ends;
    a series of key-guide bars surrounding the series of coil-guide bars whereby the stator bears on the free ends of the key-guide bars in such a way as to surround the coil-guide bars with the pole faces of the stator in engagement with the external faces of the coil-guide bars, and
    a pusher member for sliding through the series of coil-guide bars to insert the coils in the slots of the stator,
    each of said coil-guide bars having means for engaging with the stator only in correspondence with a respective pole face, said device further including orienting means for effecting the correct angular positioning of the stator, said orienting means being separated from said coil-guide bars and including terminal projections attached to said key-guide bars, said projections being for engaging the sides of the stator slots.

* * * * *